United States Patent
Wang et al.

(10) Patent No.: US 10,983,374 B2
(45) Date of Patent: Apr. 20, 2021

(54) ADJUSTMENT PEN

(71) Applicants: BOE Technology Group Co., Ltd., Beijing (CN); Hefei Xinsheng Optoelectronics Technology Co., Ltd., Hefei (CN)

(72) Inventors: Lei Wang, Beijing (CN); Weiwei Wang, Beijing (CN); Chunli Li, Beijing (CN); Liming Zhu, Beijing (CN); Kaibin Ding, Beijing (CN)

(73) Assignees: BOE Technology Group Co., Ltd., Beijing (CN); Hefei Xinsheng Optoelectronics Technology Co., Ltd., Anhui (CN)

( * ) Notice: Subject to any disclaimer, the term of this patent is extended or adjusted under 35 U.S.C. 154(b) by 286 days.

(21) Appl. No.: 16/303,826

(22) PCT Filed: Mar. 22, 2018

(86) PCT No.: PCT/CN2018/080020
§ 371 (c)(1),
(2) Date: Nov. 21, 2018

(87) PCT Pub. No.: WO2018/177189
PCT Pub. Date: Oct. 4, 2018

(65) Prior Publication Data
US 2020/0319483 A1    Oct. 8, 2020

(30) Foreign Application Priority Data
Mar. 31, 2017 (CN) .......................... 201720339046.5

(51) Int. Cl.
*G02F 1/13* (2006.01)
*B43K 21/22* (2006.01)
(Continued)

(52) U.S. Cl.
CPC ................ *G02F 1/13* (2013.01); *B43K 21/22* (2013.01); *B43K 21/24* (2013.01); *B43K 24/02* (2013.01)

(58) Field of Classification Search
CPC ........ B43K 21/22; B43K 21/24; B43K 24/02; G02F 1/13
See application file for complete search history.

(56) References Cited

U.S. PATENT DOCUMENTS 4,176,273 A * 11/1979 Fujie ....................... B29C 65/18
219/220
10,226,611 B1 * 3/2019 Collias ................ F21V 21/0885
(Continued)

FOREIGN PATENT DOCUMENTS

| CN | 2670128 Y | 1/2005 |
| CN | 101460314 A | 6/2009 |
| CN | 207008219 U | 2/2018 |

OTHER PUBLICATIONS

May 28, 2018—(WO) International Search Report and Written Opinion Appn PCT/CN2018/080020 with English Translation.

*Primary Examiner* — J C Jacyna
(74) *Attorney, Agent, or Firm* — Banner & Witcoff, Ltd.

(57) ABSTRACT

An adjustment pen, including a pen body, the pen body including a pen tip, wherein the adjustment pen further includes a light emitting unit, a control switch and a power supply module which are carried by the pen body, the light emitting unit is connected with the control switch and the power supply module to form an illumination circuit, the control switch is configured to control ON and OFF of the illumination circuit, and the light emitting unit is configured to emit a light beam toward the pen tip.

16 Claims, 4 Drawing Sheets

(51) Int. Cl.
  *B43K 21/24*   (2006.01)
  *B43K 24/02*   (2006.01)

(56) References Cited

U.S. PATENT DOCUMENTS

| | | | |
|---|---|---|---|
| 2003/0128193 A1* | 7/2003 | Huang | G06F 3/03545 |
| | | | 345/173 |
| 2005/0063178 A1* | 3/2005 | Huang | B43K 29/10 |
| | | | 362/118 |
| 2008/0198581 A1* | 8/2008 | Lee | B43K 21/02 |
| | | | 362/118 |
| 2010/0253468 A1* | 10/2010 | Devecka | B43K 8/24 |
| | | | 340/3.1 |
| 2011/0002728 A1 | 1/2011 | Izawa et al. | |
| 2018/0059806 A1* | 3/2018 | Mori | G06F 3/0317 |
| 2018/0181222 A1* | 6/2018 | Ivanov | G06F 3/03545 |
| 2019/0235650 A1* | 8/2019 | Quijano | G06F 1/169 |
| 2020/0268470 A1* | 8/2020 | Lingenfelder | A61B 90/30 |

* cited by examiner

ADJUSTMENT PEN

The application is a U.S. National Phase Entry of International Application No. PCT/CN2018/080020 filed on Mar. 22, 2018, designating the United States of America and claiming priority to Chinese Patent Application No. 201720339046.5 filed on Mar. 31, 2017. The present application claims priority to and the benefit of the above-identified applications and the above-identified applications are incorporated by reference herein in their entirety.

TECHNICAL FIELD

Embodiments of the present disclosure relates to an adjustment pen.

BACKGROUND

Printed Circuit Board (PCB) is an important part of a liquid crystal display panel and is configured to control image display of the liquid crystal panel. In the test of the liquid crystal panel, a flicker adjustment is generally required, and in the flicker adjustment of the liquid crystal panel, the magnitude of a knob type variable resistance (VR) in the PCB area is adjusted so as to adjust the flicker frequency of the liquid crystal panel. In this process, a tip of an adjustment pen is required to align with a hole of the knob type variable resistance, and then the magnitude of the knob type variable resistance is adjusted by rotating the adjustment pen.

SUMMARY

At least one embodiment of the present disclosure provides an adjustment pen, comprising a pen body, the pen body comprising a pen tip, wherein the adjustment pen further comprises a light emitting unit, a control switch and a power supply module which are carried by the pen body, the light emitting unit is connected with the control switch and the power supply module to form an illumination circuit, the control switch is configured to control ON and OFF of the illumination circuit, and the light emitting unit is configured to emit a light beam toward the pen tip.

In one embodiment of the present disclosure, the pen body comprises a pen handle and a pen shank, one end of the pen shank is fixedly connected to the pen handle, and the pen tip is located on the other end of the pen shank, and the light emitting unit, the control switch and the power supply module are all carried by the pen handle.

In one embodiment of the present disclosure, the pen handle has a cavity, the control switch comprises an actuator partially or entirely protruding from an outer surface of the pen handle, a transmission mechanism disposed in the cavity and connected with the actuator, and a contact switch located in the cavity and connected with the transmission mechanism, and the actuator is configured to drive the transmission mechanism to move relative to the pen handle, so that the contact switch switches between a closed state and an opened state in response to a change of state of connection with the illumination circuit.

In one embodiment of the present disclosure, the transmission mechanism is a telescoping mechanism.

In one embodiment of the present disclosure, the actuator is a button; the telescoping mechanism comprises a first ratchet and a second ratchet, and a ratchet sleeve disposed around the second ratchet, the button is connected to the first ratchet, the second ratchet is connected to the contact switch, the first ratchet and the second ratchet have collinear axes and are both configured to be movable within the ratchet sleeve in the axial direction, opposite sides of the first ratchet and the second ratchet are provided with a plurality of teeth in the axial direction, the plurality of teeth of the first ratchet are meshed with the plurality of teeth of the second ratchet, a plurality of guide slots spaced apart from each other are provided in an inside wall of the ratchet sleeve in an axial direction, one end of the ratchet sleeve facing away from the button is provided with a serration edge, an axial distance between a bottom of serration slot of the serration edge and an end face of the ratchet sleeve proximate to the button is d, and an axial distance between one end of the guide slot proximate to the button and the end face of the ratchet sleeve proximate to the button is m, wherein d>m, the second ratchet has a guide rib thereon which is slidable along the guide slot, and the first ratchet is configured to slide in the axial direction of the ratchet sleeve; the telescoping mechanism further comprises a spring, a first end of the spring is connected to the second ratchet, and a second end of the spring is connected to the wall surface of the cavity, and the spring is extendable and contractible in the axial direction of the ratchet sleeve.

In one embodiment of the present disclosure, the button pushes the second ratchet to slide out of the guide slot through the first ratchet, and to rotate by the action of the teeth of the first ratchet, so that the guide rib is snapped into the serration slot of the serration edge, and the spring is in a compressed state, the button pushes the second ratchet to slide out of the serration slot of the serration edge through the first ratchet again, and to rotate, so that the guide rib enters into the guide slot, and the button, the first ratchet and the second ratchet are reset by an action of the spring.

In one embodiment of the present disclosure, the contact switch comprises a first metal sheet connected to the transmission mechanism, and a second metal sheet and a third metal sheet connected to the illumination circuit, and in response of the contact switch being in the closed state, the first metal sheet is in contact with the second metal sheet and the third metal sheet.

In one embodiment of the present disclosure, the spring is disposed around the second ratchet, the first end of the spring abuts against the first metal sheet, and the second end of the spring abuts against a flange provided on the wall surface of the cavity.

In one embodiment of the present disclosure, the light emitting unit is positioned on the pen handle.

In one embodiment of the present disclosure, the light emitting unit is positioned on a surface of the pen handle on a side proximate to the pen tip.

In one embodiment of the present disclosure, a number of the light emitting unit is at least two, and the at least two light emitting units are uniformly arranged with respect to the pen body.

In one embodiment of the present disclosure, the pen body comprises a first half-shell and a second half-shell, which are detachably connected with each other.

In one embodiment of the present disclosure, the first half-shell and the second half-shell are detachably connected with each other by a screw.

BRIEF DESCRIPTION OF THE DRAWINGS

In order to clearly illustrate the technical solutions of the embodiments of the disclosure, the drawings of the embodiments will be briefly described in the following; it is obvious

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

It should be appreciated that in the present disclosure, the orientational or positional relationships indicated by the terms of "center", "upper", "lower", "front", "back", "left", "right", "vertical", "horizontal", "top", "bottom", "inside", "outside" and the like are based on the orientational or positional relationships in the mounting positions as shown in the drawings, and are merely used to facilitate the description of the present disclosure and simplify the description, rather than indicate or imply that the device or assembly referred to must have a specific orientation, be constructed and operated in a particular orientation, and thus should not be construed as limiting the present disclosure.

The terms of "first" and "second" are used for illustrative purposes only and are not to be construed as indicating or implying a relative importance or implicitly indicating the number of the technical features referred to. Thus, features defined by "first" or "second" may comprise one or more of the features, either explicitly or implicitly. In the description of the present disclosure, unless otherwise stated, "a plurality of" means two or more.

Figure 1:
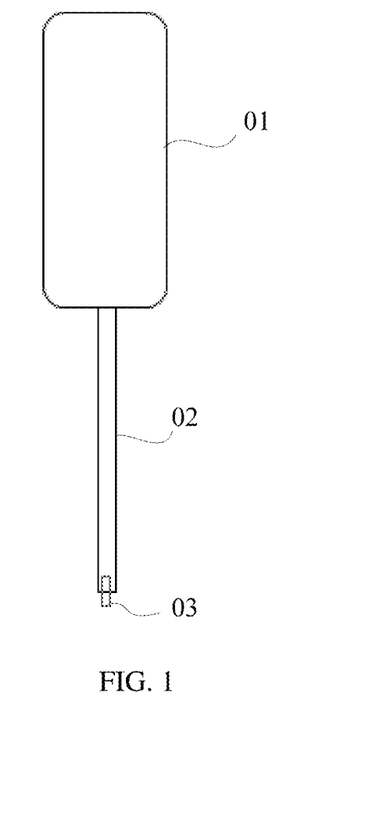
FIG. 1 is an illustrative structural view of an adjustment pen as known by the inventors.

In the technique known to the inventors, FIG. 1 illustrates an adjustment pen comprising a pen handle 01 and a pen shank 02 fixed to the pen handle 01. One end of the pen shank 02 is connected to the pen handle 01, and the other end is provided with a pen tip 03. The pen tip 03 is used to align with an adjustment hole of a knob type variable resistance.

The adjustment of the flicker frequency of the liquid crystal panel is performed in a production environment, that is, under an illumination of 10 Lux. Since the adjustment hole of the knob type variable resistance is relatively small, it is difficult for the human eyes to see the adjustment hole of the knob type variable resistance under the illumination of 10 Lux. When aligning the adjustment pen known by the inventors with the adjustment hole of the knob type variable resistance, operator's experiences and feelings plays a key role. As the skills of operators are greatly varied, especially for new hand, in the process of performing flicker adjustment by use of the adjustment pen known by the inventors, problems such as alignment difficulties and excessive time for flicker frequency adjustment are inclined to occur, as a result of which the operator's eyes are prone to fatigue, and efficiency of the flicker frequency adjustment is reduced due to the excessive time for flicker frequency adjustment.

Figure 2:
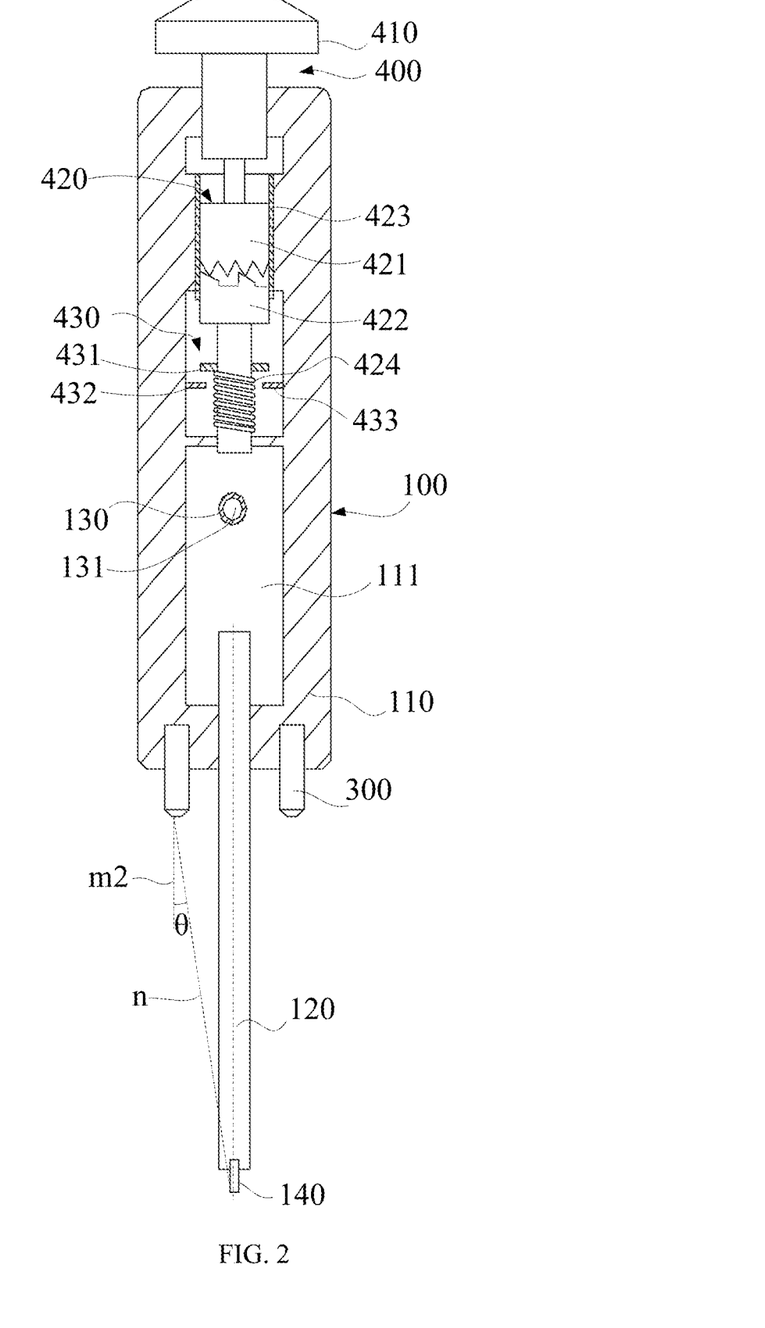
FIG. 2 is an illustrative structural view of an adjustment pen according to one embodiment of the present disclosure.
Figure 3:
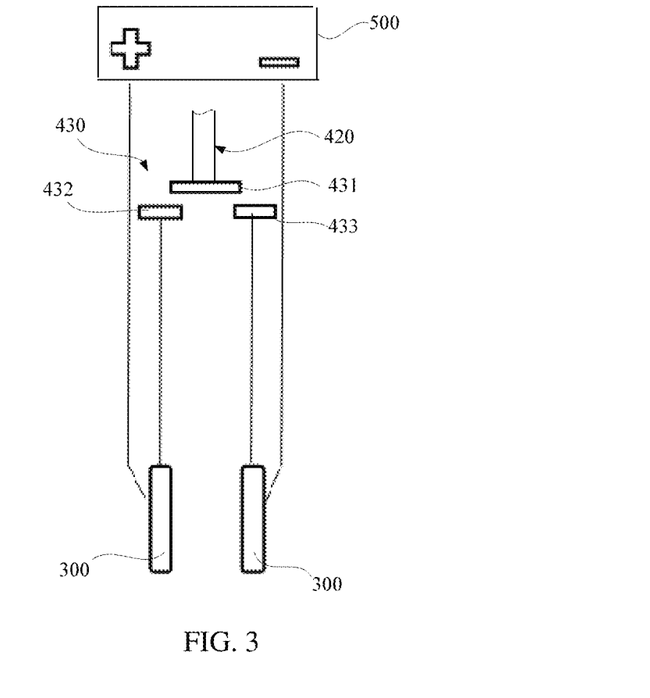
FIG. 3 is an illustrative view of an illumination circuit of an adjustment pen according to one embodiment of the present disclosure.

At least one embodiment of the present disclosure provides an adjustment pen. As illustrated in FIG. 2 and FIG. 3, the adjustment pen comprises a pen body 100 comprising a pen tip 140 configured to be inserted into an adjustment hole of a knob type variable resistance. The adjustment pen further comprises a light emitting unit 300, a control switch 400 and a power supply module 500 which are carried by the pen body 100. The light emitting unit 300 is connected with the control switch 400 and the power supply module 500 to form an illumination circuit. The control switch 400 is configured to control ON and OFF of the illumination circuit. The light emitting unit 300 is configured to emit a light beam toward the pen tip 140.

The adjustment pen according to the embodiment of the present disclosure comprises the light emitting unit 300, the control switch 400 and the power supply module 500 which are carried by the pen body 100, and the light emitting unit 300 is connected with the control switch 400 and the power supply module 500 to form the illumination circuit. In this way, when aligning the adjustment pen with the adjustment hole of the knob type variable resistance, the operator can control the power supply module 500 to supply power to the light emitting unit 300 through the control switch 400 to illuminate an area where the adjustment hole of the knob type variable resistance is located, so that the operator can clearly identify the position of the adjustment hole of the knob type variable resistance, which makes it easier for the operator to align the adjustment pen with the adjustment hole of the knob type variable resistance, so that the operator's eyes are not prone to fatigue and the flicker adjusting time of the panel can be shortened. The operator is not inclined to make mistakes during the flicker adjustment process, which ensures the test quality of the panel, and thus improves the panel's First Pass Yield (abbreviated as FPY, which refers to the number of products that have passed all tests after being processed for the first time among 100 sets of materials put in the production line); at the same time, the flicker adjusting time of the panel can be shortened, thereby increasing production efficiency.

In some embodiments, the power supply module 500 comprises a battery, a battery bay, a charging module, and an adapter that can provide electrical energy.

In some embodiments, the light emitting unit 300 comprises a lighting bulb, an LED lamp, or the like capable of emitting light after being supplied with power.

In some embodiments, the light emitting unit 300 can emit a light beam toward the pen tip 140, which means that the light beam emitted by the light emitting unit 300 can at least partially fall into an area surrounding the pen tip 140, that is, the pen tip 140 is located in the area within an angle θ formed by a line m2 in FIG. 2 (the optical axis of the light beam emitted by the light emitting unit 300, passing through the center of the light exiting surface of the light emitting unit 300) and a line n (the line connecting the center of the light exiting surface of the light emitting unit 300 and the pen tip 140).

In some embodiments, the pen body 100 can have a variety of configurations. For example, the pen body 100 can be configured to have a structure in which the pen body 100 comprises a cylindrical rod, one end of which is provided with the pen tip 140, and by which the light emitting unit 300, the control switch 400, and the power supply module 500 are carried.

In some embodiments, the pen body 100 can be configured to have the following structure: as illustrated in FIG. 2, the pen body 100 comprises a pen handle 110 and a pen shank 120. One end of the pen shank 120 is fixedly connected to the pen handle 110, and the other end is provided with the pen tip 140. The light emitting unit 300, the control switch 400 and the power supply module 500 are all carried by the pen handle 110.

Compared with the configuration in which the pen body 100 comprises a cylindrical rod, in the configuration illustrated in FIG. 2, since the pen body 100 comprises the pen handle 110 and the pen shank 120, it facilitates the installation of the light emitting unit 300 in a more convenient manner, and at the same time, it is convenient for the operator to hold the pen.

In some embodiments, referring to FIG. 2, the pen handle 110 comprises a cavity 111. The control switch 400 comprises an actuator 410, a transmission mechanism 420, and a contact switch 430. The actuator 410 partially or entirely protrudes from an outer surface of the pen handle 110. The transmission mechanism 420 is disposed in the cavity 111 and is connected to the actuator 410. The contact switch 430 is located in the cavity 111 and is connected to the transmission mechanism 420. The contact switch 430 is connected into the illumination circuit. The actuator 410 can drive the transmission mechanism 420 to move relative to the pen handle 110, thereby driving the contact switch 430 to switch between a closed state and an opened state. When aligning the adjustment pen with the adjustment hole of the knob type variable resistance, the operator can apply a force to the actuator 410 to drive the transmission mechanism 420 to move relative to the pen handle 110, thereby driving the contact switch 430 to close, and thus the light emitting unit 300 is powered to emit light, thereby facilitating the alignment with the adjustment hole of the knob type variable resistance. At the end of the flicker adjustment of the panel, the operator can apply a force to the actuator 410 again to cause the transmission mechanism 420 to move relative to the pen handle 110, thereby driving the contact switch 430 to disconnect and supply no power to the light emitting unit 300, and thus the light emitting unit 300 stops emitting light, so that the power consumption of the light emitting unit 300 can be saved. Since the pen handle 110 has the cavity 111 configured to accommodate the actuator 410, the transmission mechanism 420 and the contact switch 430, the internal space of the pen handle 110 can be fully utilized, and the volume of the adjustment pen can be reduced, thereby facilitating gripping and operating by the operator.

In some embodiments, the transmission mechanism 420 can be configured to have a variety of structures. For example, the transmission mechanism 420 comprises a screw mechanism, the actuator 410 can drive the screw mechanism to rotate, and the screw mechanism can be advanced or retracted in a straight line during rotation so that the contact switch 430 is switched between a closed state and an opened state.

In some embodiments, as illustrated in FIG. 2, the transmission mechanism 420 can comprise a telescoping mechanism that only has two motions, namely, an extending motion and a retracting motion. In this way, the opening and closing of the contact switch 430 can be realized by the telescoping mechanism, which facilitates the operation of the operator.

In some embodiments, the telescoping mechanism can be implemented in a variety of configurations. For example, the telescoping mechanism can comprise the following structure. The telescoping mechanism comprises a transmission rod. One end of the transmission rod is connected to the actuator 410, while the other end is connected to the contact switch 430. A spring is disposed around the transmission rod and is positioned between the transmission rod and the wall of the cavity 111. One end of the spring abuts against a first flange provided on the transmission rod, while the other end abuts against a second flange provided on a wall surface of the cavity 111.

When the operator applies a force to the actuator 410, the transmission rod moves linearly and closes the contact switch 430, while the spring is in a compressed state. After the operator stops applying a force to the actuator 410, the transmission rod is reset by the force of the spring and the contact switch 430 is disconnected. In this way, the operator can realize a click control of the illumination of the light emitting unit 300 by the actuator 410 (i.e., a force is applied to the actuator 410, the transmission rod is moved, and the light emitting unit 300 is turned on; the actuation of the actuator 410 is stopped, the transmission rod is reset, and the light emitting unit 300 is turned off).

In some embodiments, as illustrated in FIG. 2, the telescoping mechanism can also comprise a telescoping mechanism used by a ballpoint pen, that is, the operator applies a force to the actuator 410, the telescoping mechanism is extended, the contact switch 430 is closed, and the light emitting unit 300 is turned on; the actuation of the actuator 410 is stopped, the telescoping mechanism remains in the extended state, and the light emitting unit 300 remains turned on; the actuator 410 is applied with a force again, the telescoping mechanism is retracted, the contact switch 430 is disconnected, and the light emitting unit 300 is turned off.

In the case where the closing and opening of the contact switch 430 can be achieved, the telescoping mechanism of the ballpoint pen can be configured in various forms.

Figure 4:
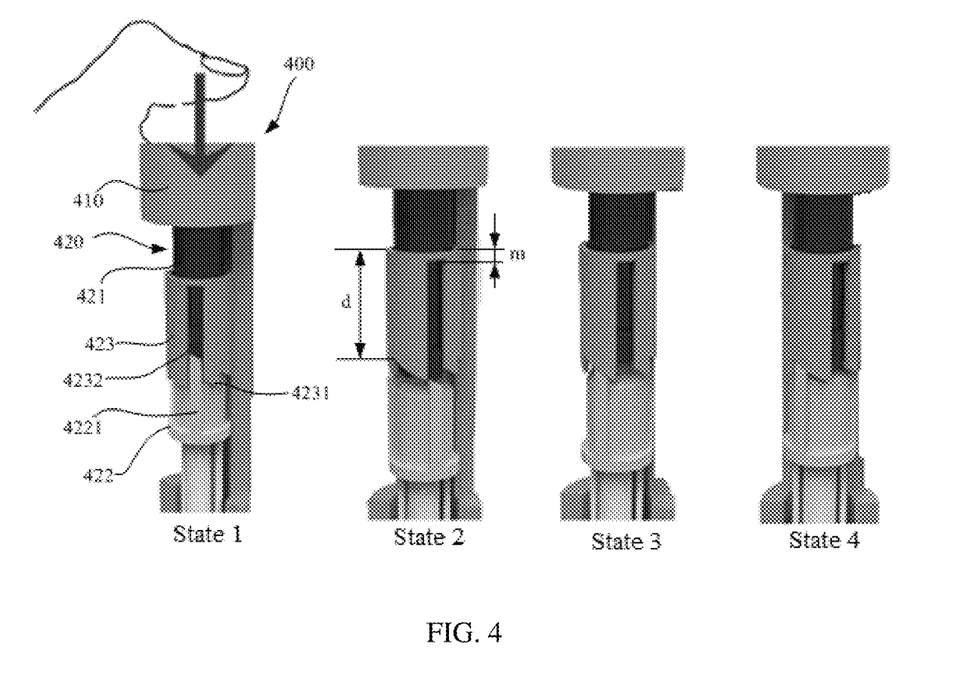
FIG. 4 is a process state view of a telescopic mechanism of an adjustment pen closing a contact switch according to one embodiment of the present disclosure.
Figure 5:
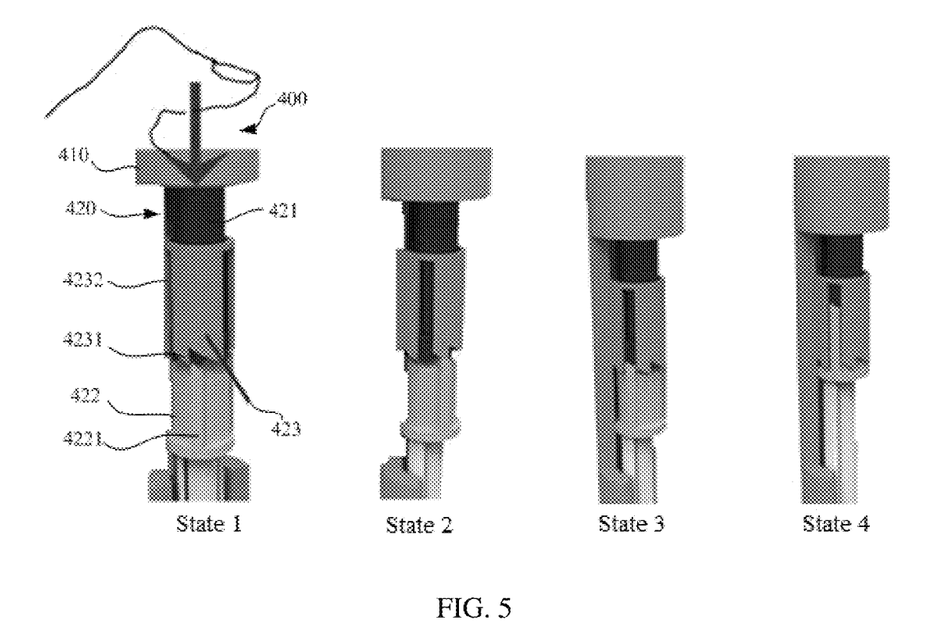
FIG. 5 is a process state view of a telescopic mechanism of an adjustment pen disconnecting a contact switch according to one embodiment of the present disclosure.

Referring to FIG. 2, FIG. 4 and FIG. 5, in some embodiments, the actuator 410 is a button (in addition to a button, the actuator 410 can also be a tab, and the operator drives the telescoping mechanism by toggling the tab). At this time, the telescoping mechanism can be configured to have the following structure.

The telescoping mechanism comprises a first ratchet 421 and a second ratchet 422, and a ratchet sleeve 423 disposed around the second ratchet 422. The button is connected to the first ratchet 421. The second ratchet 422 is connected to the contact switch 430. The first ratchet 421 and the second ratchet 422 have collinear axes and are configured to be movable within the ratchet sleeve 423 in the axial direction. The opposite sides of the first ratchet 421 and the second ratchet 422 are provided with a plurality of teeth in the axial direction. The teeth of the first ratchet 421 are meshed with the teeth of the second ratchet 422. A plurality of guide slots 4232 spaced apart from each other are provided in the wall of the ratchet sleeve 423 in the axial direction. One end of the ratchet sleeve 423 facing away from the button is provided with a serration edge 4231. The axial distance between the bottom of the serration slot of the serration edge 4231 and the end face of the ratchet sleeve 423 proximate to the button is d, and the axial distance between one end of the guide slot 4232 proximate to the button and the end face of the ratchet sleeve 423 proximate to the button is m, wherein d>m (as illustrated in FIG. 4). The second ratchet 422 has a guide rib 4221 which is slidable along the guide slot 4232, and the first ratchet 421 slides only in the axial direction of the ratchet sleeve 423. By satisfying d>m, when the guide rib 4221 is engaged with the bottom of the serration slot of the serration edge 4231, the second ratchet 422 is ensured to move axially by a certain distance relative to an initial position, so as to activate the contact switch 430 to close. The ratchet sleeve 423 can be designed to be separate from the pen handle 110 or can be integrally formed with the wall surface of the cavity 111 of the pen handle 110.

The telescoping mechanism further comprises a spring 424, one end of which is connected to the second ratchet 422, while the other end of which is connected to the wall surface of the cavity 111. The spring 424 is extendable and contractible in the axial direction of the ratchet sleeve 423.

When the button is pressed, the first ratchet 421 moves along its axial direction, thereby pushing the second ratchet 422 to slide out of the guide slot 4232 (as illustrated by State 1 and State 2 in FIG. 4). At this time, the second ratchet 422 is rotated by the action of the teeth of the first ratchet 421, so that the guide ribs 4221 are snapped into the serration slots of the serration edge 4231 (as illustrated by State 3 and State 4 in FIG. 4). The spring 424 is in a compressed state at this time and applies an elastic force to the second ratchet 422, so that the guide ribs 4221 can be tightly caught in the serration slots of the serration edge 4231. When the button is pressed again, the button pushes the second ratchet 422 to move through the first ratchet 421, so that the guide ribs 4221 slide out of the serration slots of the serration edge 4231 (as illustrated by State 1 and State 2 in FIG. 5). At this time, the second ratchet 422 is rotated again by the action of the teeth of the first ratchet 421, thereby causing the guide ribs 4221 to enter the guide slots 4232 (as illustrated by State 3 in FIG. 5), and the button, the first rachet, and the second rachet are reset by the elastic force of the spring 424 (as illustrated by State 4 in FIG. 5).

Referring to FIG. 2, in some embodiments, the contact switch 430 comprises a first metal sheet 431 connected to the transmission mechanism 420, and a second metal sheet 432 and a third metal sheet 433 connected to an illumination circuit. When the contact switch 430 is in the closed state, the first metal sheet 431 is in contact with the second metal sheet 432 and the third metal sheet 433. The contact switch 430 realizes on/off of the illumination circuit by use of the movement of the metal sheets, so that the structure of the contact switch 430 can be simplified, thereby reducing the cost of the adjustment pen, and at the same time, the connection between the contact switch 430 and the transmission mechanism 420 can also be facilitated. The second metal sheet 432 and the third metal sheet 433 can be fixed on the wall surface of the cavity 111.

The spring 424 can be arranged in a variety of ways. For example, the spring 424 can be disposed in such a manner that the spring 424 is disposed around the second ratchet 422, with one end abutting against a third flange provided on the second ratchet 422, and the other end abutting against a fourth flange provided on the wall surface of the cavity 111. For example, the spring 424 can be arranged in the following manner. As illustrated in FIG. 2, the spring 424 is disposed around the second ratchet 422, the first end of the spring 424 abuts against the first metal sheet 431, and the other end abuts against a flange provided on the wall surface of the cavity 111. At this time, it is not necessary to provide a third flange on the second ratchet 422.

In the adjustment pen of the embodiment of the present disclosure, the light emitting unit 300 can be disposed at different positions. For example, the light emitting unit 300 can be disposed on the pen shank 120. For example, as illustrated in FIG. 2, the light emitting unit 300 can be located on the pen handle 110, which facilitates the installation of the light emitting unit 300 and can also make the appearance of the adjustment pen more beautiful.

In order to improve the effect of the light emitting unit 300 illuminating the adjustment hole of the knob type variable resistance, in some embodiments, as illustrated in FIG. 2, the light emitting unit 300 is located on the wall surface of the pen handle 110 approximate to the pen tip 140. Thus, the light emitting unit 300 is made close to the pen tip 140, which is beneficial to illuminate the adjustment hole of the knob type variable resistance when aligning the adjustment hole of the knob type variable resistance, and thus is beneficial for the operator to observe and operate.

In some embodiments, in order to further improve the effect of the light emitting unit 300 illuminating the adjustment hole of the knob type variable resistance, a plurality of light emitting units 300 can be provided, for example at least two light emitting units 300 are provided. As illustrated in FIG. 2, two light emitting units 300 are provided, and they are uniformly disposed around the pen body. By providing a plurality of light emitting units 300, the illuminance of the light emitting unit 300 can be improved. By uniformly disposing the plurality of light emitting units 300 around an axis of the pen shank 120, the adjustment hole of the knob type variable resistance can be illuminated in all directions, so that the illumination effect of the light emitting unit 300 can be improved and it becomes easier for the operator to see the adjustment hole of the knob type variable resistance. The plurality of light emitting units 300 can be connected in series in the illumination circuit, or can be connected in parallel in the illumination circuit, which is not limited in the present disclosure.

In some embodiments, in order to make the light emitting unit 300 more power-saving under the premise that the adjustment hole of the knob type variable resistance can be illuminated, the light emitting unit 300 has an illuminance in the range of 200-500 Lux. If the illuminance of the light emitting unit 300 is too low, the operator is prevented from clearly observing the adjustment hole of the knob type variable resistance; if the illuminance of the light emitting unit 300 is too high, the power consumption is large, and thus the heat generation is great, and the life of the illumination circuit is inclined to be shortened. Therefore, the illuminance range of the light emitting unit 300 is set to be 200-500 Lux, thereby providing a suitable brightness, which helps the operator to see the adjustment hole of the knob type variable resistance, reduces power consumption, and improves the service life of the illumination circuit.

For example, compared to an illuminance of 200 Lux, when the illuminance of the light emitting unit 300 is 500 Lux, the light emitting unit 300 can provide illumination with a higher brightness, which helps the operator to see the adjustment hole of the knob type variable resistance.

In some embodiments, in order to facilitate the detachment and assembly of the transmission mechanism 420, the spring 424, the contact switch 430, and etc., the pen handle 110 comprises a first half-shell and a second half-shell, which are detachably connected with each other. Since the two half-shells are detachably connected with each other, when the transmission mechanism 420 and the like located in the cavity 111 needs to be replaced, the first half-shell and the second half-shell can be disassembled, and then after the replacement is completed, the first half-shell and the second half-shell are assembled. Thus, it facilitates the replacement of the components within the cavity 111 of the pen handle 110, thereby extending the service life of the adjustment pen.

For example, the first half-shell and the second half-shell can be detachably connected by screws, that is, as illustrated in FIG. 2, the first half-shell and the second half-shell are provided with a screw mounting post 130. A central hole 131 of the screw mounting post 130 is provided for insertion of a screw, and the screw is connected to the screw mounting post 130 on the two half-shells to achieve a detachable connection of the first half-shell and the second half-shell. The screw mounting post 130 is located between the second ratchet 422 and the pen shank 120 to prevent contact therebetween. As illustrated in FIG. 2, when the contact switch 430 is in OFF state, a distance between the screw mounting post 130 and a lower end face of the second ratchet 422 is smaller than the stroke of the second ratchet 422 during operation, so as to prevent the screw mounting post 130 from interfering with the second ratchet 422.

The foregoing are merely exemplary embodiments of the disclosure, but the scope of protection of the present disclosure is not limited thereto. The protection scope of the disclosure shall be defined by the attached claims.

The present disclosure claims priority of Chinese Patent Application No. 201720339046.5 filed on Mar. 31, 2017, the disclosure of which is hereby entirely incorporated by reference as a part of the present disclosure.

The invention claimed is:

1. An adjustment pen, comprising a pen body, the pen body comprising a pen tip, wherein the adjustment pen further comprises a light emitting unit, a control switch, and a power supply module which are carried by the pen body, the light emitting unit is connected with the control switch and the power supply module to form an illumination circuit, the control switch is configured to control ON and OFF of the illumination circuit, and the light emitting unit is configured to emit a light beam toward the pen tip,
wherein the pen body comprises a pen handle, the pen handle has a cavity, the control switch comprises an actuator partially or entirely protruding from an outer surface of the pen handle, a transmission mechanism disposed in the cavity and connected with the actuator, and a contact switch located in the cavity and connected with the transmission mechanism,
the actuator is configured to drive the transmission mechanism to move relative to the pen handle, so that the contact switch switches between a closed state and an opened state in response to a change of state of connection with the illumination circuit,
the contact switch comprises a first metal sheet connected to the transmission mechanism, and a second metal sheet and a third metal sheet connected to the illumination circuit, and in response of the contact switch being in the closed state, the first metal sheet is in contact with the second metal sheet and the third metal sheet.

2. The adjustment pen according to claim 1, wherein the pen body comprises a pen shank, one end of the pen shank is fixedly connected to the pen handle, and the pen tip is located on the other end of the pen shank, and the light emitting unit, the control switch, and the power supply module are all carried by the pen handle.

3. The adjustment pen according to claim 1, wherein the transmission mechanism is a telescoping mechanism.

4. The adjustment pen according to claim 3, wherein the actuator is a button,
the telescoping mechanism comprises a first ratchet and a second ratchet, and a ratchet sleeve disposed around the second ratchet, the button is connected to the first ratchet, the second ratchet is connected to the contact switch, the first ratchet and the second ratchet have collinear axes and are both configured to be movable within the ratchet sleeve in an axial direction, opposite sides of the first ratchet and the second ratchet are provided with a plurality of teeth in the axial direction, the plurality of teeth of the first ratchet are meshed with the plurality of teeth of the second ratchet, a plurality of guide slots spaced apart from each other are provided in an inside wall of the ratchet sleeve in the axial direction, one end of the ratchet sleeve facing away from the button is provided with a serration edge, an axial distance between a bottom of a serration slot of the serration edge and an end face of the ratchet sleeve proximate to the button is d, and an axial distance between one end of a guide slot proximate to the button and the end face of the ratchet sleeve proximate to the button is m, wherein d>m, the second ratchet has a guide rib thereon which is slidable along the guide slot, and the first ratchet is configured to slide in the axial direction of the ratchet sleeve,
the telescoping mechanism further comprises a spring, a first end of the spring is connected to the second ratchet, and a second end of the spring is connected to a wall surface of the cavity, and the spring is extendable and contractible in the axial direction of the ratchet sleeve.

5. The adjustment pen according to claim 4, wherein the button pushes the second ratchet to slide out of the guide slot through the first ratchet, and to rotate by an action of the teeth of the first ratchet, so that the guide rib is snapped into the serration slot of the serration edge, and the spring is in a compressed state, the button pushes the second ratchet to slide out of the serration slot of the serration edge through the first ratchet again, and to rotate, so that the guide rib enters into the guide slot, and the button, the first ratchet, and the second ratchet are reset by an action of the spring.

6. The adjustment pen according to claim 4, wherein the spring is disposed around the second ratchet, the first end of the spring abuts against the first metal sheet, and the second end of the spring abuts against a flange provided on the wall surface of the cavity.

7. The adjustment pen according to claim 2, wherein the light emitting unit is positioned on the pen handle.

8. The adjustment pen according to claim 7, wherein the light emitting unit is positioned on a surface of the pen handle on a side proximate to the pen tip.

9. The adjustment pen according to claim 1, wherein a number of the light emitting unit is at least two, and the at least two light emitting units are uniformly arranged with respect to the pen body.

10. The adjustment pen according to claim 1, wherein the pen body comprises a first half-shell and a second half-shell, which are detachably connected with each other.

11. The adjustment pen according to claim 10, wherein the first half-shell and the second half-shell are detachably connected with each other by a screw.

12. The adjustment pen according to claim 2, wherein the transmission mechanism is a telescoping mechanism.

13. An adjustment pen, comprising a pen body, the pen body comprising a pen tip, wherein the adjustment pen further comprises a light emitting unit, a control switch, and a power supply module which are carried by the pen body, the light emitting unit is connected with the control switch and the power supply module to form an illumination circuit, the control switch is configured to control ON and OFF of the illumination circuit, and the light emitting unit is configured to emit a light beam toward the pen tip, wherein the pen body comprises a pen handle, the pen handle has a cavity, the control switch comprises an actuator partially or entirely protruding from an outer surface of the pen handle, a transmission mechanism disposed in the cavity and connected with the actuator, and a contact switch located in the cavity and connected with the transmission mechanism, the actuator is configured to drive the transmission mechanism to move relative to the pen handle, so that the contact switch switches between a closed state and an opened state in response to a change of state of connection with the illumination circuit, the transmission mechanism is a telescoping mechanism, the actuator is a button, the telescoping mechanism comprises a first ratchet and a second ratchet, and a ratchet sleeve disposed around the second ratchet, the button is connected to the first ratchet, the second ratchet is connected to the contact switch, the first ratchet and the second ratchet have collinear axes and are both configured to be movable within the ratchet sleeve in a axial direction, opposite sides of the first ratchet and the second ratchet are provided with a plurality of teeth in the axial direction, the plurality of teeth of the first ratchet are meshed with the plurality of teeth of the second ratchet, a plurality of guide slots spaced apart from each other are provided in an inside wall of the ratchet sleeve in the axial direction, one end of the ratchet sleeve facing away from the button is provided with a serration edge, an axial distance between a bottom of a serration slot of the serration edge and an end face of the ratchet sleeve proximate to the button is d, and an axial distance between one end of a guide slot proximate to the button and the end face of the ratchet sleeve proximate to the button is m, wherein d>m, the second ratchet has a guide rib thereon which is slidable along the guide slot, and the first ratchet is configured to slide in the axial direction of the ratchet sleeve, the telescoping mechanism further comprises a spring, a first end of the spring is connected to the second ratchet, and a second end of the spring is connected to a wall surface of the cavity, and the spring is extendable and contractible in the axial direction of the ratchet sleeve.

14. The adjustment pen according to claim 13, wherein the button pushes the second ratchet to slide out of the guide slot through the first ratchet, and to rotate by an action of the teeth of the first ratchet, so that the guide rib is snapped into the serration slot of the serration edge, and the spring is in a compressed state, the button pushes the second ratchet to slide out of the serration slot of the serration edge through the first ratchet again, and to rotate, so that the guide rib enters into the guide slot, and the button, the first ratchet, and the second ratchet are reset by an action of the spring.

15. The adjustment pen according to claim 5, wherein the spring is disposed around the second ratchet, the first end of the spring abuts against the first metal sheet, and the second end of the spring abuts against a flange provided on the wall surface of the cavity.

16. The adjustment pen according to claim 2, wherein the pen body comprises a first half-shell and a second half-shell, which are detachably connected with each other.

\* \* \* \* \*